D. H. RENÉ.
PACKING JOINT FOR BRAKE CYLINDERS.
APPLICATION FILED DEC. 22, 1910.
1,085,222.
Patented Jan. 27, 1914.
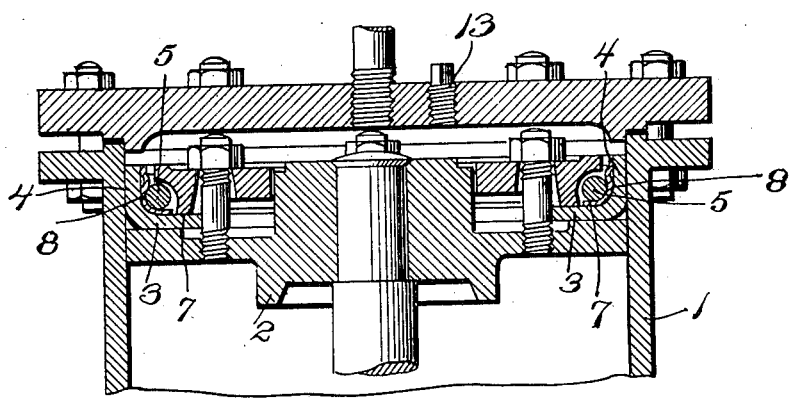
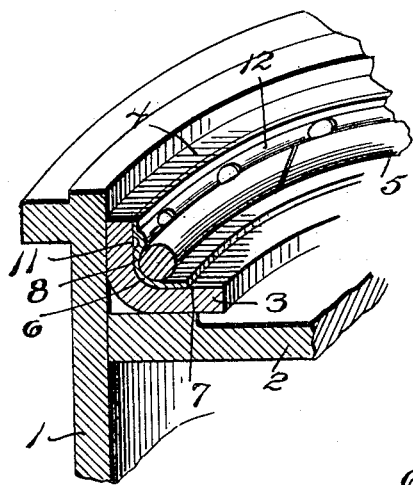
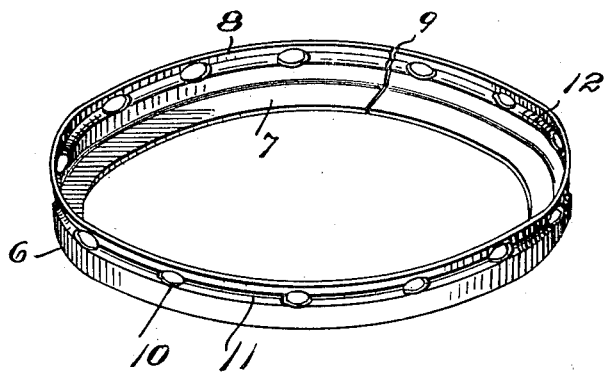
Inventor
D. H. René.

UNITED STATES PATENT OFFICE.

DOMINICK H. RENÉ, OF BIRMINGHAM, ALABAMA, ASSIGNOR TO H. W. JOHNS-MANVILLE COMPANY, A CORPORATION OF NEW YORK.

PACKING-JOINT FOR BRAKE-CYLINDERS.

1,085,222.

Specification of Letters Patent. Patented Jan. 27, 1914.

Application filed December 22, 1910. Serial No. 598,778.

*To all whom it may concern:*

Be it known that I, DOMINICK HARRY RENÉ, citizen of the United States, residing at Birmingham, in the county of Jefferson and State of Alabama, have invented certain new and useful Improvements in Packing-Joints for Brake-Cylinders, of which the following is a specification.

The present invention comprehends certain new and useful improvements in packing joints, and aims to provide an improved device of this character which is particularly adapted for use in air brake systems to establish an efficient joint between the piston and the walls of the brake cylinder.

It is well known that the circumferential flange of the leather packing ring is ordinarily pressed against the walls of the cylinder by means of a split expander ring of round wire which is placed within the flange. However, this expander ring has been found defective in several ways. For instance, the expander ring has a relatively narrow bearing on the flange and thus tends to wear through from the inside of the leather. Again, the narrow bearing permits the flange to crimp away from the walls of the cylinder, thereby resulting in leakage around the piston and decreasing the efficiency of the brake.

The object of the present invention is to provide a bearing ring which is used in conjunction with the ordinary packing and expander rings and which is interposed between these rings and has a broad bearing on the leather flange in order to hold the same flat against the cylinder walls to insure a tight joint. The bearing ring also prevents the expander ring from wearing the inside of the leather flange, and thus materially increases the length of life of the packing ring.

Another object of the invention is to provide an annular groove in the periphery of the bearing ring and to form a plurality of apertures opening into the groove from the inside of said ring, whereby to conduct lubricant through the ring and retain the lubricant at the inner surface of the leather flange to keep the leather moist and pliable.

A further object of the invention is to provide on the inner surface of the bearing ring means for engaging the expander ring to brace the bearing ring against inward movement and to retain the expander ring against accidental displacement.

A still further object of the invention is to provide a bearing ring of the character described, which possesses to a marked degree the characteristics of simplicity, durability and strength, which is thoroughly reliable and efficient in use, and which is susceptible of being easily and cheaply manufactured.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawing in which:

Figure 1 is a sectional view illustrating the application of my invention to a brake cylinder; Fig. 2 is a fragmentary perspective view of the packing joint; and, Fig. 3 is a perspective view of the bearing ring detached.

Corresponding and like parts are referred to in the following description and indicated in all the views of the accompanying drawing by the same reference characters.

Referring to the drawing, the numeral 1 designates an air brake cylinder within which a piston 2 operates. The piston is provided with a leather packing ring 3, the body portion of which lies in a plane substantially parallel to the plane of the piston. The packing ring is somewhat cup-shaped and for this purpose has its marginal portion deflected laterally on one side to constitute an annular circumferential flange 4 that bears against the interior walls of the cylinder 1. Within the flange is an ordinary split expander ring 5 which is formed of round wire and is considerably less in diameter than the width of the flange.

My improved bearing ring 6 is constructed of sheet steel and is angular in cross section and consists of two substantially perpendicularly disposed wings, designated 7 and 8 respectively. The bearing ring receives the expander ring 5 in the angle between the wings. The wing 7 is substantially flat and abuts against the body portion of the leather packing ring 3, while the wing 8 is substantially cylindrical and lies within the leather flange 4 and is of approximately the same width as said flange. The bearing ring is split, as indicated at 9, so as to be adapted to be expanded by the spring action of the ring 5, to press the wing 8 firmly against the inner surface of the leather flange. By virtue of its broad bearing on the leather flange the wing 8 holds the entire flange flat against the walls of the cylinder to provide a tight joint. As the bearing ring is interposed between the expander ring and the leather packing ring, it serves, of course, to prevent the former from wearing through from the inside of the latter, which has heretofore been likely to occur when the round expander ring was in direct contact with the leather.

The wing 8 is formed with an annular series of apertures 10 extending therethrough at predetermined intervals, the apertures being suitably located so as not to be covered by the expander ring 5. Communication between the adjacent apertures is established by means of an annular groove 11 which extends around the periphery of the wing 8 and intersects the apertures. The function of the apertures is to conduct through the bearing ring some of the lubricant which is introduced from time to time through the oil plug opening 13 in the pressure head. After passing through the apertures the lubricant flows into the annular groove 11 and is retained thereby at the inner surface of the leather flange 4 to keep the leather moist and thus maintain the necessary flexibility. This is a very important feature of the present invention, since without thorough lubrication the leather will become dry and crack, whereby to result in leakage around the piston.

The groove 11 is preferably formed by pressing the metal inwardly. The object of this arrangement is two-fold; first, to prevent the metal from being unduly weakened, and second, to provide a rib or bead 12 on the inner surface of the wing 8. The rib is substantially annular, although it is not continuous on account of being interrupted at intervals by the apertures 10. The bead engages the ring 5 and constitutes a stop to retain the same securely in place against accidental lateral displacement. The rib also affords the wing 8 an extended bearing on the expanded ring, whereby to brace said wing to insure against the laterally projecting portion thereof yielding inwardly away from the leather flange. It is understood of course that the wing 7 of the bearing ring 6 does not extend under the piston follower and is not clamped thereby, but is left free to move under the expansive action of spring ring 5.

From the foregoing description in connection with the accompanying drawing, it will be apparent that I have provided a particularly efficient packing joint in which the leather packing ring is held firmly in contact with the walls of the cylinder to obviate possible leakage around the piston. The improved bearing ring forming the subject matter of my improved invention protects the packing leather from the wear of the expander ring, and also provides for the thorough lubrication of the packing leather, thus materially increasing the life of the leather and effecting a material economy in the cost of maintenance of the air brake system. The efficiency of the brake system is, of course, materially increased by the reduction of the cylinder leakage to a minimum.

While I have shown and described the present invention in connection with an air brake cylinder, it is to be understood that it is not limited to any such use but is susceptible of general application.

Having thus described the invention, what I claim as new is;

1. In a piston packing expander, the combination of a flexible packing ring, a bearing ring positioned within the packing ring and fitting against the inner surface thereof, and means for conducting lubricant through the bearing ring to the inner surface of the packing ring, said conducting means including a circumferential series of apertures extending entirely through the bearing ring, and an annular groove formed in the periphery of the ring and intersecting the apertures to establish communication therebetween.

2. As a new article of manufacture, a piston packing expander ring formed with an annular series of apertures extending entirely therethrough and opening outwardly through the periphery thereof, the ring being also formed with an annular peripheral groove intersecting the apertures and establishing communication therebetween, and a stop rib provided on the inner surface of the ring.

3. In a piston packing, the combination with a flexible packing ring having its inner surface substantially flat in the direction of the axis of the ring, and a split expander ring located entirely within the packing ring and formed of round spring wire, of an expansible metallic ring separate from and interposed between the aforementioned rings and having a broad bearing on the inner surface of the packing ring.

4. In combination with a continuous packing having a part thereof cylindrical and adapted to bear against the cylinder wall, a sheet-metal ring having a substantially cylindrical portion adapted to lie within and a second portion extending away from said cylindrical part of said packing, and an independent and disconnected self-expansible expander ring adapted to bear against said cylindrical portion of said sheet-metal ring to expand said ring and packing and against said second portion of said sheet-metal ring to prevent displacement of said sheet-metal ring along said packing.

5. In combination with a continuous packing having a part thereof cylindrical and adapted to bear against the cylinder wall, a sheet-metal ring having a substantially cylindrical portion adapted to lie within and a substantially plane portion extending away from said cylindrical part of said packing, and an independent and disconnected self-expansible spring wire ring adapted to bear against said cylindrical portion of said sheet-metal ring to expand said ring and packing and against said plane portion of said sheet-metal ring to prevent displacement of said sheet-metal ring along said packing.

6. In combination, a piston, a follower adjacent said piston, said piston and follower having a circular recess formed between them, a circular packing secured to said piston and extending adjacent said follower, a sheet-metal ring having a substantially cylindrical portion adapted to lie within said packing and extending between said packing and follower and having a second portion extending into said circular recess, and an independent and disconnected self-expansible wire ring adapted to bear against said cylindrical portion of said sheet-metal ring to expand said ring and packing, said wire ring lying within said recess and coacting with said second portion of said sheet-metal ring whereby displacement of said sheet-metal ring along said packing is prevented.

7. In combination with a circular packing, a sheet-metal ring having a portion adapted to bear directly against said packing, an inwardly extending projection on said sheet-metal ring, and an independent and disconnected self-expansible spring ring coacting with said sheet-metal ring at one side of said projection.

8. In combination, a piston having an annular recess, a circular packing fastened to said piston and having a free portion extending axially across and beyond said recess, a sheet-material ring lying within said free portion of said packing and having a part thereof extending into said annular recess, and an independent and disconnected self-expansible ring coacting with said sheet-material ring and substantially filling the remaining portion of said recess.

In testimony whereof, I affix my signature in presence of two witnesses.

DOMINICK H. RENÉ. [L. S.]

Witnesses:
  JAS. L. WALKER,
  A. C. SCHOEDINGER.